United States Patent [19]

Skarsvaag et al.

[11] Patent Number: 4,683,759
[45] Date of Patent: Aug. 4, 1987

[54] CHARACTERIZATION OF TWO-PHASE FLOW IN PIPES

[75] Inventors: Kristian Skarsvaag, Gjerdrum; Andreas J. Sunde; Sverre Thue, both of Oslo, all of Norway

[73] Assignee: Texaco Inc., White Plains, N.Y.

[21] Appl. No.: 812,157

[22] Filed: Dec. 23, 1985

[51] Int. Cl.$^4$ .................................................. G01F 1/74
[52] U.S. Cl. .............................. 73/861.04; 73/61.1 R
[58] Field of Search .......... 73/61.1 R, 861.04, 861.05, 73/861.06; 378/54, 57

[56] References Cited

U.S. PATENT DOCUMENTS

| | | | |
|---|---|---|---|
| 3,818,200 | 6/1974 | Pilhofer | 73/861.04 |
| 3,974,683 | 8/1976 | Martin | 73/61 R |
| 4,228,353 | 10/1980 | Johnson | 73/861.04 |
| 4,282,481 | 8/1981 | Dunn | 324/446 |
| 4,483,199 | 11/1984 | Beiermann et al. | 73/861.04 |
| 4,516,432 | 5/1985 | Hironaga et al. | 73/861.04 |
| 4,562,584 | 12/1985 | Narabayashi | 378/54 |

FOREIGN PATENT DOCUMENTS 1597340  9/1981  United Kingdom ............. 73/861.04

Primary Examiner—Stewart J. Levy
Assistant Examiner—Hezron E. Williams
Attorney, Agent, or Firm—Robert A. Kulason; James J. O'Loughlin; Ronald G. Gillespie

[57] ABSTRACT

Gamma radiation transmission measurements are made with one-shot-collimation to determine the distribution of voids within a gas-liquid mixture flowing in a pipe. The distribution of voids in selected portions of the pipe, taken together with statistical and logical tests applied thereto, provides information from which are determined: type of flow pattern or flow regime, the profile of a large gas bubble in slug flow, and the gas and the liquid volume flow rates in slug flow.

21 Claims, 4 Drawing Figures

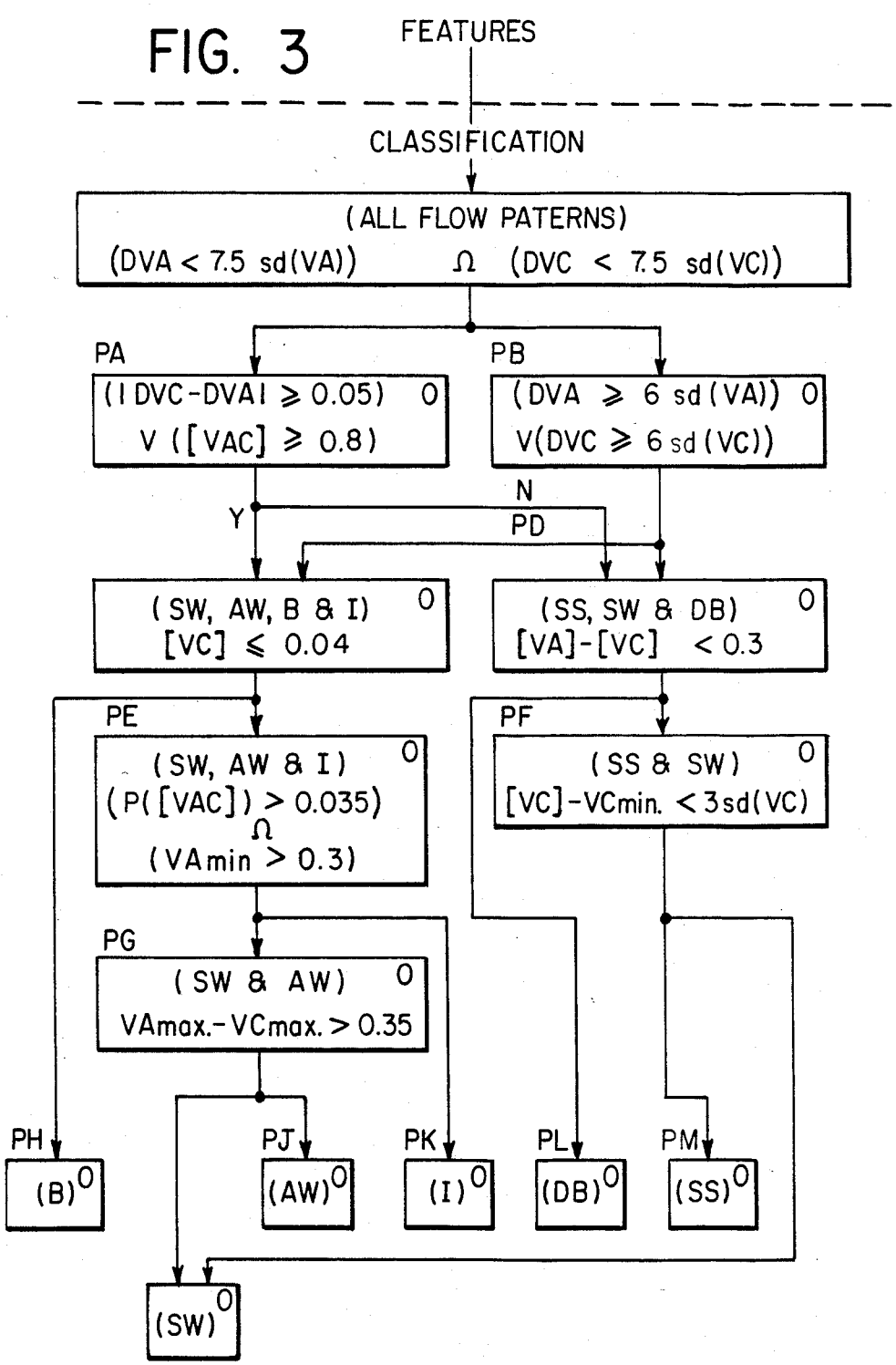

4,683,759

CHARACTERIZATION OF TWO-PHASE FLOW IN PIPES

BACKGROUND OF THE INVENTION

1. Field of the Invention

The simultaneous transport of oil and gas in pipelines is of increasing importance, particularly for undersea oil production. Heretofore there has been a lack of basic knowledge and of technology where two-phase flow is concerned. As the flow of the two fluids may follow any one of a number of possible patterns or regimes, the precise determination of void fraction within the flowing fluids and of the mass flow in a two-phase pipeline requires a particular technology in terms of metering devices.

SUMMARY OF THE INVENTION

In a pipe carrying a mixture of liquid and gas, measurements are made from which the following quantities can be determined: flow regime or pattern (i.e. which of several different types of multiphase flow is occurring, whether stratified, annular, dispersed bubble, intermittent or slug flow, etc.), and, in the case of slug flow, the profile of the slug, and flow rates of the gas and the liquid components.

More particularly this invention relates to methods and measuring devices for using gamma-ray technology for monitoring various aspects of two-phase flow of oil and gas in offshore pipelines and risers. The intensity of gamma radiation transmitted through such a pipeline is a measure of how much void space (i.e. gas volume) there is within the pipe, and the loss in intensity of gamma radiation transmitted is a measure of how much liquid-filled space (i.e. oil and/or water volume) there is within the pipe. It is important however in making such gamma-ray measurements to know what the flow regime is or at least to compensate for the type of flow regime, since the intensity of transmitted gamma radiation will be different for different distributions of the same quantities of liquid and of gas within the pipe. In this invention the necessary compensation is achieved by use of the one-shot-collimator technique, which provides a measure of the cross-sectional void fraction within the pipe nearly independently of the flow regime (R. P. Gardner, R. H. Bean, and J. K. Ferrell, *Nucl. Appl. & Techn.* 8, 1970, pp. 88-94).

This invention employs the one-shot-collimator technique in conjunction with gamma-ray source and detector arrangements wherein the path of the gamma rays is transverse to the pipe containing the two-phase flow. In a preferred embodiment three such arrangements are employed to make the measurements according to this invention upon the two-phase flow within a horizontal pipe. One arrangement measures the gamma rays passing through the upper half of the pipe (Station A), one measures the gamma rays passing through the lower half of the pipe at the same axial location (Station C), and the third arrangement measures the gamma rays passing through the upper half of the pipe at a second axial location (Station B) a measured distance downstream from the first axial location. Each of these measurements is made repeatedly at a rapid repetition rate with a strong gamma-ray source and with efficient and high speed detection and counting apparatus such that variations in the transmitted gamma-ray intensity as the fluids flow along the pipe are measured with high fidelity. Since transmitted gamma-ray intensity is a measure of the void fraction within the pipe, the method and apparatus of this invention provide a time series of data that faithfully represents the changes with time of the void fractions in the fluids passing each station, A, B, and C. A statistical method is employed to deduce automatically the flow pattern or regime from the void fraction measurements determined at stations A and C. In this method deductions are made about the type of flow from the magnitudes of the void fractions at each station, the variations in time of those magnitudes, the distribution in magnitude about the average magnitude, and the spatial distributions of the void fraction magnitudes. For example, if station A reads a steadily high void fraction and station C a steadily low void fraction, the indication is of a stratified flow, with gas in the upper half of the pipe and liquid in the lower half. If, on the other hand, both stations read steady but medium magnitude void fractions, the indication is of a dispersed bubble flow. Further, as will be apparent to one skilled in the art of multiphase flow measurement, and as will be explained more fully in the Detailed Description hereof, the void fractions measured at stations A and C are used to determine uniquely what the flow pattern or regime is within the pipe. Moreover this determination is made automatically by use of programs that sort the void fraction data on the basis of logic and statistical analysis.

In the case of slug flow, additional measurements are possible which are particularly valuable. In this case measurements at station B are also involved. Void fraction measurements at station A and also at station B provide a detailed, faithful profile of the slug as it passes these stations. Knowing the distance between stations A and B and the pipe cross-sectional area, and obtaining the time of passage of the profile from A to B and the volume of the gas bubble from the detailed void fraction data, one can determine the linear velocity and the volume velocity of both the gas and the liquid in the slug.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings wherein:

FIG. 3 is a flow chart schematically illustrating the classification of the flow patterns within a pipe.

DETAILED DESCRIPTION

This invention relates to methods of, and measuring devices which utilize gamma-ray technology for, monitoring and characterizing the behavior of two-phase flow of liquid (e.g. oil and gas) in pipelines and risers such as are used in offshore petroleum operations.

These methods and devices are applicable to the monitoring of combinations of condensed phase (i.e. liquid or solid) and gaseous phase or even vacuum. The term "void" as used herein refers to the gaseous phase or to vacuum.

This invention relates broadly to characterizing flow, where the characterization of flow may be the determination of the type of flow pattern or flow regime within a pipe, the delineation of the profile of a large gas bubble in slug flow, or the measurement of the gas or the liquid volume flow rate in slug flow within a pipe.

There are known methods for estimating cross-sectional void fractions by multibeam gamma-ray densitometers. See for example Petrick, M. and Swanson, B. S., *Review of Scientific Instruments,* 29, 1958, pp. 1079–1085 and Harms, A. A. and Forrest, C. F., *Nuclear Science and Engineering,* 46, 1971, pp. 408–413. These known methods suffer from the disadvantage that in order to determine the cross-sectional void fraction a model for the flow pattern has to be assumed.

There is a known method, the one-shot-collimator technique, which compensates for the varying thickness of the pipe wall as traversed by the gamma-ray beam, and which gives a measure of the cross-sectional void fraction nearly independently of the flow pattern (R. P. Gardner, R. H. Bean, and J. K. Ferrell, *Nucl. Appl. & Techn.* 8, 1970, pp. 88–94). This known method has to our knowledge only been applied to pipelines of small dimensions.

The invention applies the one-shot-collimator technique to dimensions of steel pipes typical in field operations which technique is made possible by using one, two or more detector crystals oriented with their axes at right angles to the axis of the pipe, thereby with one detector crystal covering the half (in the case of vertical pipes) or with two crystals covering the whole cross section, and measuring the void fractions in the corresponding sections.

The source can be $^{137}$Cs emitting 662 keV gamma-rays for smaller dimensions of the pipe and $^{60}$Co emitting 1.1 and 1.3 MeV gamma-rays for larger dimensions.

The detectors are NaI(Tl) scintillation crystals optically coupled to photomultiplier tubes and operated at counting rates of up to 600,000 c/s. The data are obtained in the form of time series with dwell times in the millisecond range.

Figure 1:
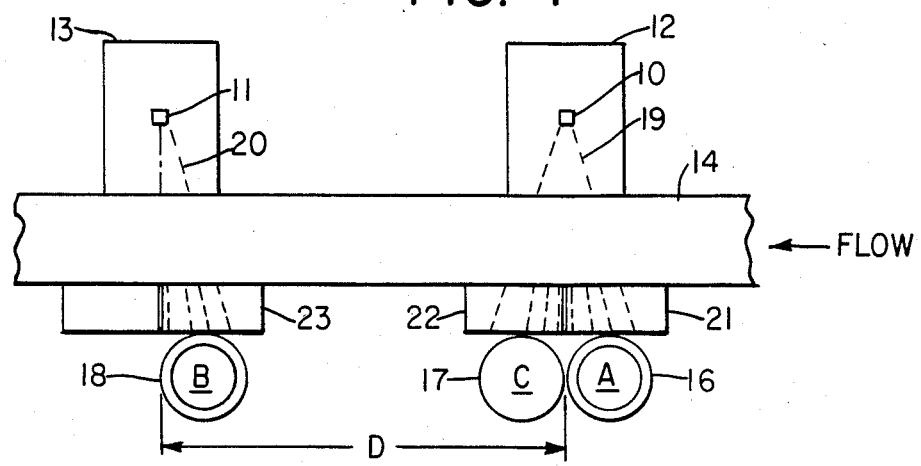
FIG. 1 is a schematic plan view of a pipe in which a gas-liquid mixture is flowing together with sources of gamma radiation and gamma radiation detection equipment for making one-shot-collimator measurements of gamma radiation transmitted at three stations, A, B, and C.
Figure 2:
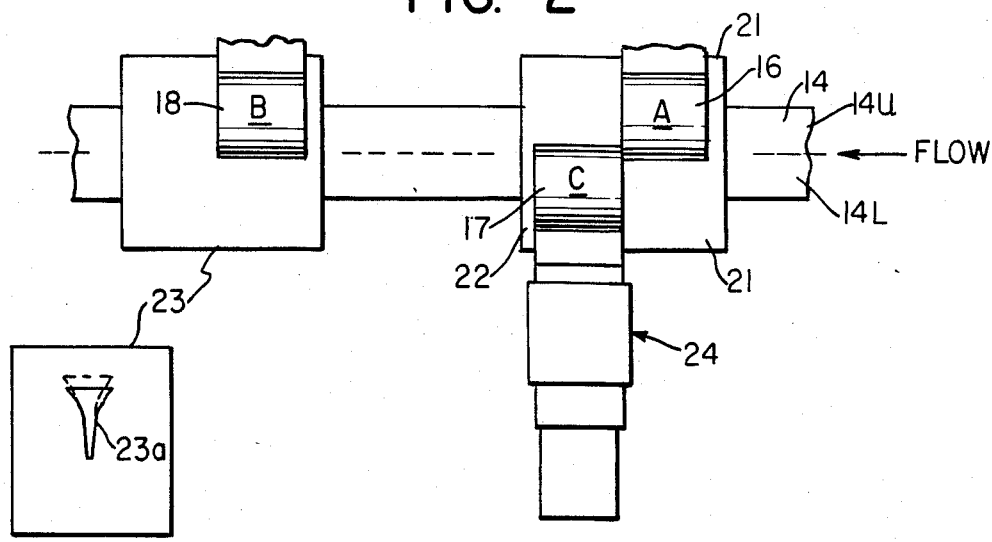
FIG. 2 is a schematic elevation view of the same pipe and equipment as in FIG. 1.

In this invention measurements of gamma radiation transmitted through a pipe carrying fluid flow are made at measuring stations indicated schematically by A, B, and C in FIGS. 1 and 2. FIGS. 1 and 2 are respectively a plan view and an elevation view of the pipe and the gamma radiation source and measurement apparatus. Direction of fluid flow is indicated by arrows. At station C a source of gamma radiation 10 within shielding 12 emits gamma rays which emanate from shielding 12 through tapered aperture 19 therein and traverse the lower half 14L of pipe 14 and one-shot-collimator 22 to reach scintillation crystal 17. Scintillation crystal 17 is optically coupled to a photomultiplier tube, which in turn is attached to electrical supply and detection circuitry as is conventional with scintillation detection. The photomultiplier tube and electrical circuitry for crystal 17 is indicated in FIG. 2 by numeral 24.

At station A closely adjacent to station C source 10 emits gamma rays which emanate from shielding 12 through tapered aperture 19 and traverse the upper half 14U of pipe 14 and one-shot-collimator 21 to reach scintillation crystal 16. Scintillation crystal 16 is coupled to its photomultiplier tube and associated electrical circuitry which are similar to photomultiplier tube and circuitry 24, although not fully shown.

At a distance D downstream from the location of station A there is another measurement station B. At station B a source of gamma radiation 11 within shielding 13 emits gamma rays which emanate from shielding 13 through tapered aperture 20 therein and traverse the upper half 14U of pipe 14 and one-shot-collimator 23 to reach scintillation crystal 18. Scintillation crystal 18 is coupled to its photomultiplier tube and associated electrical circuitry which are similar to photomultiplier tube and circuitry 24, although not fully shown.

One-shot-collimators 21, 22, and 23 are designed in accordance with the principles set forth in the publication by Gardner, Bean, and Ferrell cited above. Each one-shot-collimator-consists of a lead shield in which there is an aperture that varies in magnitude in such a way that the varying thickness of the pipe wall as traversed by the gamma-ray beam is compensated for. One-shot-collimator 23 has such an aperture 23a as shown in the detail of one-shot-collimator 23 in FIG. 2. In this way a single gamma-ray beam can be employed subtending the entire flow channel, i.e. the full width of 14U or 14L, so that the collimation physically sums the appropriate weighted values of many small pseudo-traverse beams and provides a single response that is a unique function of the average void fraction across the flow channel independent. of the distribution of void fractions across the channel.

Measurements at station A give the void fraction in the upper half of the pipe; measurements at station C give the void fraction in the lower half of the pipe; the sum of measurements at stations A and C gives the cross-sectional void fraction at the location of stations A and C; measurements at station B give the void fraction in the upper half of the pipe,; and (more importantly) measurements of the time between changes observed in the void fraction at station A and corresponding changes observed at station B give the velocity of a gas bubble (as in slug flow) as the flow covers the known distance D between stations A and B.

The type of flow pattern or flow regime in a mixture of a gas and a liquid flowing in a horizontally disposed pipe (i.e. one having a horizontal component in its orientation) can be identified by observing the void fractions in the upper and the lower halves of the pipe. This is accomplished by the application of statistical and logical tests to data on void fractions obtained at stations A and C. First a set of characteristic parameters, called "features", are extracted, from the data. Then as the result of applying the statistical and logical tests and partitioning the "feature" space, assignment is made to a type of flow pattern, which may be stratified smooth (SS), stratified wavy (SW), annular wavy (AW), elongated bubble (B), intermittent or slug (I), or dispersed bubble (DB).

A flow chart illustrating the classification of the flow patterns is schematically shown in FIG. 3, based on data from stations A and C. In this flow chart a circle in two boxes indicates that the preceding box is a selection, with YES (Y) to the left and NO (N) to the right. The sign $\Omega$ stands for .AND., and $\xi$ stands for .OR.

There are chosen, as "features", maximum and minimum values of the void fractions with their standard deviations, along with values averaged over the whole time interval of measurement, and derived quantities. The standard deviation is the statistical standard deviation as estimated from counting statistics. The data can also be characterized usefully by the probability distributions of the various void fractions.

The "features" with which the method of this invention is concerned and which appear in the flowchart, FIG. 3, are listed below with their symbols and definitions.

"FEATURES"

VA Void fraction in upper half of pipe
VC Void fraction in lower half of pipe
VAC Cross-sectional void fraction in pipe
[VA] Average void fraction in upper half of pipe in time interval used for classification
[VC] Average void fraction in lower half of pipe in time interval used for classification
[VAC] Average cross-sectional void fraction in pipe in time interval used for classification
VAmax The highest void fraction in upper half of pipe in time interval used for classification
VCmax The highest void fraction in lower half of pipe in time interval used for classification
VAmin The lowest void fraction in upper half of pipe in time interval used for classification
VCmin The lowest void fraction in lower half of pipe in time interval used for classification
DVA The difference VAmax—VAmin
DVC The difference VCmax—VCmin
sd(VA) The Standard Deviation in VA
sd(VC) The Standard Deviation in VC P ([VAC]) The probability per 0.01 cross-sectional void fraction for VAC=[VAC]

The classification is done in several steps. In each step the samples are divided into two parts by selection or a conditional statement shown in the FIG. 3 chart as YES (Y) to the left and NO (N) to the right, the parts being named P, PA, PB, . . . PM.

P, PA, and PB differentiate between systematic and statistical deviations in the void fractions VA and VC with selection in two parts PC (SW, AW, B, and I flow) and PD (SS, SW, and DB flow). SW flow can possibly appear in either of them since the deviations may and may not be significant.

P is a selection in PA and PB by the size of the maximum deviations in the void fractions, DVA and DVC. The limiting values are set to 7.5 Standard Deviations.

PA is a selection in the two parts, PC and PD, either by the difference between the maximum deviations DVC−DVA, where the limiting value is set at 0.05, or by the average cross-sectional void fraction [VAC] with a limiting value of 0.8, where the latter condition takes into account the small deviations in AW flow with high average cross-sectional void fraction.

PB is a selection in the two parts, PC and PD, by the maximum deviations in the void fractions, DVA and DVC. The limiting values are set at six Standard Deviations.

B flow is characterized by a low average void fraction in the lower half of the pipe, [VC]. Accordingly PC is a selection in the two parts PH (B flow) and PE (SW, AW, and I flow) with a limiting value of the average void fraction [VC]=0.04.

The probability distribution P(VAC) for SW and AW flow is quite narrow and nearly symmetrical about its most probable value which nearly coincides with the average value. The probability distribution P(VAC) for I flow on the other hand is skew, has two peaks, and the most probable value of the void fraction is in most cases not coinciding with the average value. The probability for VAC=[VAC] is thus used as a "feature". That probability is however somewhat dependent upon the void fraction VAmin. PE is accordingly a selection in the two parts PG (SW and AW flow) and PK (I flow) by a condition on the probability for VAC=[VAC] with a limiting value at 0.035, and a condition on the void fraction VAmin with a limiting value at 0.3.

PG is a selection in the two parts PI (SW flow) and PJ (AW flow) by the larger up-down asymmetry in the former, as defined by the difference in the maximum void fractions, VAmax −VCmax, with a limiting value at 0.35.

PD is a selection in the two parts PL (DB flow) and PF (SS and SW flow) by the smaller up-down asymmetry in the former, as defined by the difference in average void fractions, [VA]−[VC], with a limiting value at 0.3.

PF is a selection in the two parts PM (SS flow) and PI (SW flow) by the maximum deviation of the void fraction VC from the average value, [VC]−VCmin, with a limiting value of three standard deviations.

Figure 4:
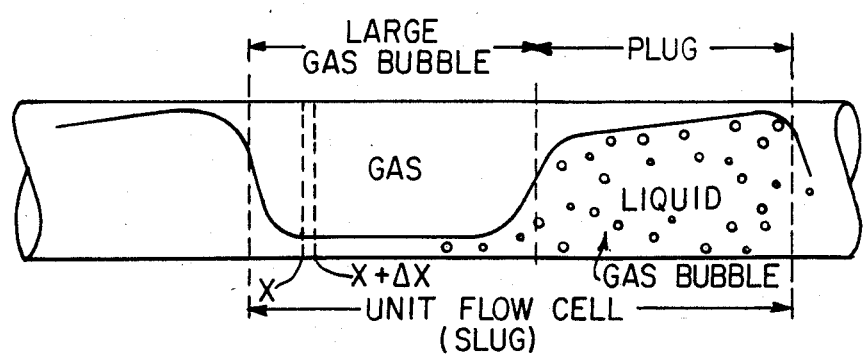
FIG. 4 is an illustration of a typical slug in a pipe in which a gas-liquid mixture is flowing in the pattern known as slug flow.

In addition to characterizing the type of flow pattern, the apparatus of this invention lends itself in the case of slug or intermittent flow also to characterizing the profile of the slug, and the flow rates of the gas and the liquid components. A typical slug in slug flow is illustrated in FIG. 4 where the flow is as indicated by the arrow. In this illustration the liquid component of a gas-liquid mixture almost fills the entire cross-section of the pipe in that portion of the flowing mixture known as the plug. The liquid plug typically contains numerous small gas bubbles. Upstream of the liquid plug is the large gas bubble. The large gas bubble and the liquid plug together comprise a unit flow cell, which is the smallest portion of the gas-liquid mixture as measured along the length of the pipe that is representative of the entire flowing mixture; i.e. the entire flowing mixture may be correctly represented by repeated unit flow cells. A void fraction measured by the gamma-ray one-shot-collimator technique in this invention is the proportion of the total cross-section of the pipe traversed by the gamma rays which is filled with gas.

An actual measurement of the void fraction within a cross-section of the pipe at the location indicated by x in FIG. 4 is obtained by measuring the gamma radiation which is transmitted through the thin "slice" or transverse section between x and x +delta-x (the dotted lines in FIG. 4) and comparing that measurement with measurements on the same thin "slice" when the pipe is filled with liquid and when the pipe is filled with gas. The void fraction is given by the difference between the gas-liquid mixture measurement and the liquid-filled measurement divided by the difference between the gas-filled measurement and the liquid-filled measurement. FIG. 4 shows a "slice" across the full cross-section of the pipe, whereas in the practice of this invention it will be recalled that measurements are actually limited to the upper or the lower half of the pipe.

The apparatus employed in the practice of this invention makes repeated measurements at a rapid repetition rate with a strong gamma-ray source and with efficient and high speed detection and counting equipment such that variations in the transmitted gamma-ray intensity as the fluids flow along the pipe are measured with high fidelity. Since transmitted gamma-ray intensity is a measure of the void fraction within the pipe, the method and apparatus of this invention provide a time series of data that faithfully represents the changes with time of the void fractions in the fluids passing each measuring station. The data in that time series in fact constitute a profile of the entire unit flow cell or slug depicted in FIG. 4.

By timing the appearance of the slug profile at stations A and B and knowing the distance D between those two stations one obtains the velocity of flow or what is known as the speed of propagation of the large gas bubbles. By averaging all the measured void fractions over one unit flow cell or slug one obtains the average cross-sectional void fraction.

The product of the average cross-sectional void fraction, the speed of propagation, and the pipe cross-sectional area gives the volume flow rate of the gas component in slug flow. The product of the average cross-sectional void fraction and the speed of propagation gives what is known as the superficial gas velocity, i.e. the linear velocity at which gas flowing at the same volume flow rate would flow if there were no liquid component present.

The volume flow rate of the liquid component in slug flow can also be obtained, once the volume flow rate of the gas component has been determined. As is well known from studies of gas-liquid slug flow (e.g. a paper by A. E. Dukler and M. G. Hubbard, *Ind. Eng. Chem., Fundam.*, 14, 1975, pp. 337–347) the volume flow rate of the liquid component cannot be obtained simply by observing the rate of advance of the slug, since the observed rate of advance is the sum of the volume flow rate of the liquid in the slug and the rate of buildup of the liquid slug at its front due to growth of the front of the liquid slug by the action of picking up liquid that has been shed from the back of the preceding liquid slug. There is a known relationship however by which the volume flow rate of the liquid can be determined, using the volume flow rate of the gas as determined in accordance with this invention. This relationship is based on the "drift flux model" of G. B. Wallis ("One-Dimensional Two-phase Flow", McGraw-Hill Book Company, New York, 1969) and is expressed as $$\begin{pmatrix} \text{Speed of} \\ \text{Propagation} \\ \text{of Gas Bubble} \end{pmatrix} = \begin{pmatrix} \text{Rise Velocity} \\ \text{of Bubbles in} \\ \text{Stagnant Liquid} \end{pmatrix} + \begin{pmatrix} \text{A Constant} & \text{Sum of Liquid} \\ \text{divided by} & \text{times and Gas Volume} \\ \text{Pipe C-S Area} & \text{Flow Rates} \end{pmatrix}$$

This relationship appears also as Equation (1) in a paper by K. H. Bendiksen, *Int. J. Multiphase Flow*, 10, 1984, pp. 467–483. To obtain Bendiksen's Eq. (1) from the "drift flux model" relationship cited above, substitute $V_L$ for Sum of Liquid and Gas Volume Flow rates divided by the Pipe Cross-Sectional Area.

In the "drift flux model" relationship the Speed of Propagation of the Gas Bubble is a quantity measured in this invention, the Gas Volume Flow Rate is a quantity determined from measurements made in accordance with this invention, and the pipe Cross-Sectional Area is a known parameter in the practice of this invention. In order to obtain the Liquid Volume Flow Rate one needs in addition to these known and measured quantities only the Rise Velocity of Bubbles in Stagnant Liquid and the Constant. As set forth in the Bendiksen paper cited above the Rise Velocity of Bubbles in Stagnant Liquid, $v_O$, and the Constant, $C_O$, may be found either by experiment or from the literature on multiphase flow in inclined tubes. Bendiksen further provides in his Table 1 a number of representative values for $V_O$ and $C_O$. Thus the Liquid Volume Flow Rate is obtained from known quantities and from measurements made in accordance with this invention. The Superficial Liquid Velocity, which is sometimes referred to in this art, is the Liquid Volume Flow Rate divided by the pipe Cross-Sectional Area and represents the linear velocity at which the liquid component would flow if there were no gas component present.

It will be appreciated that the foregoing may make other modes of operation and procedures, which are in effect other embodiments of the basic method of this invention, apparent to those skilled in the art. It is the intention to cover all such variations and modifications as come within the true spirit of the scope of the present invention in the appended claims.

We claim:

1. A method for characterizing the flow of a mixture of a gas phase and a condensed phase flowing within a pipe which comprises the steps of:
   making a measurement of a void fraction of said mixture in one portion of a transverse section of said pipe,
   making a measurement of a void fraction of said mixture in another portion of a transverse section of said pipe, and
   characterizing the flow of said mixture in accordance with said void fraction measurements.

2. A method for characterizing the flow pattern of a mixture of a gas phase and a condensed phase flowing within a pipe which comprises the steps of:
   making a measurement of a void fraction of said mixture in one portion of a transverse section of said pipe,
   making a measurement of a void fraction of said mixture in another portion of a transverse section of said pipe, and
   characterizing the flow pattern of said mixture in accordance with said void fraction measurements.

3. A method for characterizing a gas bubble in the flow of a mixture of a gas phase and a condensed phase flowing within a pipe which comprises the steps of:
   making repeated measurements of a void fraction within said mixture, and
   characterizing a gas bubble in the flow of said mixture in accordance with said void fraction measurements.

4. A method for characterizing the rate of flow of a component in a gas-liquid mixture flowing within a pipe having a known cross-sectional area wherein said gas occurs as bubbles within said liquid which comprises the steps of:
   measuring the speed of propagation of said bubbles through said pipe,
   measuring the average cross-sectional void fraction of said mixture, and
   deriving the rate of flow of a component in said mixture from said measured speed of propagation, said measured average cross-sectional void fraction, and said known pipe cross-sectional area.

5. A method for characterizing the rate of flow of the liquid component in a gas-liquid mixture flowing within a pipe having a known cross-sectional area wherein said gas occurs as bubbles within said liquid which comprises the steps of:

measuring the flow rate of the gas component in said gas-liquid mixture, measuring the speed of propagation of said bubbles through said pipe, and deriving the rate of flow of the liquid component in said gas-liquid mixture from said measured flow rate of the gas component, said measured speed of propagation of bubbles, and said known pipe cross-sectional area.

6. A method for deriving the type of flow pattern of a mixture of a gas phase and a condensed phase which is flowing within a pipe which comprises the steps of:

making a measurement of a void fraction of said mixture in one portion of a transverse section of said pipe, making a measurement of a void fraction of said mixture in another portion of a transverse section of said pipe, and deriving the type of flow pattern of the mixture in accordance with said void fraction measurements.

7. A method for deriving the type of flow pattern of a mixture of a gas phase and a condensed phase which is flowing within a pipe which comprises the steps of:

making repeated measurements of a void fraction of said mixture in one portion of a transverse section of said pipe, making repeated measurements of a void fraction of said mixture in another portion of a transverse section of said pipe, and deriving the type of flow pattern of the mixture in accordance with said void fraction repeated measurements.

8. The method of claim 7 wherein said condensed phase is a liquid, said one portion of a transverse section is an upper portion thereof, and said another portion of a transverse section is a lower portion thereof.

9. A method for identifying the type of flow pattern of a mixture of a gas and a liquid which is flowing within a horizontally disposed pipe which comprises the steps of:

making repeated measurements of a void fraction of said mixture in an upper portion of a transverse section of said pipe, making repeated measurements of a void fraction of said mixture in a lower portion of a transverse section of said pipe, deriving statistical features from said measurements in said upper portion of a transverse section and said lower portion of a transverse section, and identifying the type of flow pattern of said mixture within said pipe in accordance with said derived statistical features.

10. The method of claim 9 wherein said statistical features comprise maximum values, minimum values, average values, standard deviations, and a measure of the probability of occurrence of an average value of selected ones of said measurements.

11. The method of claim 9 wherein said void fraction measurements are made by a gamma-ray attenuation technique.

12. The method of claim 9 wherein said void fraction measurements are made by a gamma-ray attenuation technique using a one-shot-collimator.

13. A method for deriving the flow rate of the gas component in a gas-liquid mixture flowing within a pipe having a known cross-sectional area wherein said gas occurs as bubbles within said liquid which comprises the steps of:

measuring the speed of propagation of said bubbles through said pipe, measuring the average cross-sectional void fraction of said mixture, and deriving the flow rate of the gas component in said mixture from said measured speed of propagation, said measured average cross-sectional void fraction, and said known pipe cross-sectional area.

14. The method of claim 13 wherein said step of measuring the average cross-sectional void fraction comprises making repeated measurements of a void fraction within a unit flow cell of said mixture and deriving therefrom the average cross-sectional void fraction within said unit flow cell.

15. A method for deriving the flow rate of the gas component in a gas-liquid mixture flowing within a pipe having a known cross-sectional area, wherein said gas occurs as a series of bubbles within said liquid, which comprises the steps of:

making repeated void fraction measurements within a unit flow cell of said mixture, obtaining from said void fraction measurements the profile of a gas bubble in said unit flow cell, deriving from said obtained profile the average cross-sectional void fraction of said unit flow cell, measuring the speed of propagation of said profile through said pipe, and deriving the flow rate of the gas component in said mixture from said measured speed of propagation, said derived average cross-sectional void fraction, and said known pipe cross-sectional area.

16. The method of claim 15 wherein said void fraction measurements are made by a gamma-ray attenuation techhique.

17. A method for deriving the flow rate of the liquid component in a gas-liquid mixture flowing within a pipe having a known cross-sectional area wherein said gas occurs as bubbles within said liquid which comprises the steps of:

measuring the speed of propagation of said bubbles through said pipe, measuring the flow rate of the gas component in said mixture, and deriving the flow rate of the liquid component in said mixture from said measured flow rate of said gas component, said measured speed of propagation of bubbles, and said known pipe cross-sectional area.

18. The method of claim 17 wherein said step of measuring the flow rate of the gas component in said mixture comprises measuring the average cross-sectional void fraction of said mixture and deriving the flow rate of said gas component from said measured speed of propagation, said measured average cross-sectional void fraction and said known pipe cross-sectional area.

19. A method for deriving the flow rates of the gas and liquid components in a gas-liquid mixture flowing within a pipe having a known cross-sectional area, wherein said gas occurs as a series of bubbles within said liquid, which comprises the steps of:

making repeated void fraction measurements within a unit flow cell of said mixture, obtaining from said void fraction measurements the profile of a gas bubble in said unit flow cell, deriving from said obtained profile the average cross-sectional void fraction of said unit flow cell, measuring the speed of propagation of said profile through said pipe, deriving the flow rate of the gas component in said mixture from said measured speed of propagation of said profile, said derived average cross-sectional void fraction, and said known pipe cross-sectional area, and deriving the flow rate of the liquid component in said mixture from said derived flow rate of said gas component, said measured speed of propagation of said profile, and said known pipe cross-sectional area.

20. Apparatus for deriving the rate of flow ot the gas component in a gas-liquid mixture flowing within a pipe having a known cross-sectional area wherein said gas occurs as bubbles within said liquid comprising:

means for measuring the speed of propagation of said bubbles through said pipe, and means for measuring the average cross-sectional void fraction of said mixture, whereby said rate of flow of said gas component in said mixture may be derived from said measured speed of propagation, said measured average cross-sectional void fraction, and said known pipe cross-sectional area.

21. Apparatus for deriving the rate of flow of the liquid component in a gas-liquid mixture flowing within a pipe having a known cross-sectional area wherein said gas occurs as bubbles within said liquid comprising:

means for measuring the speed of propagation of said bubbles through said pipe, and means for measuring the rate of flow of the gas component in said gas-liquid mixture, whereby said rate of flow of the liquid component in said gas-liquid mixture may be derived from said measured rate of flow of said gas component, said measured speed of propagation of bubbles, and said known pipe cross-sectional area.

* * * * *